Aug. 23, 1938.                J. D. LEWIS                2,127,778
                    DISHWASHING AND STERILIZING MACHINE
                         Filed Nov. 12, 1935        2 Sheets-Sheet 1
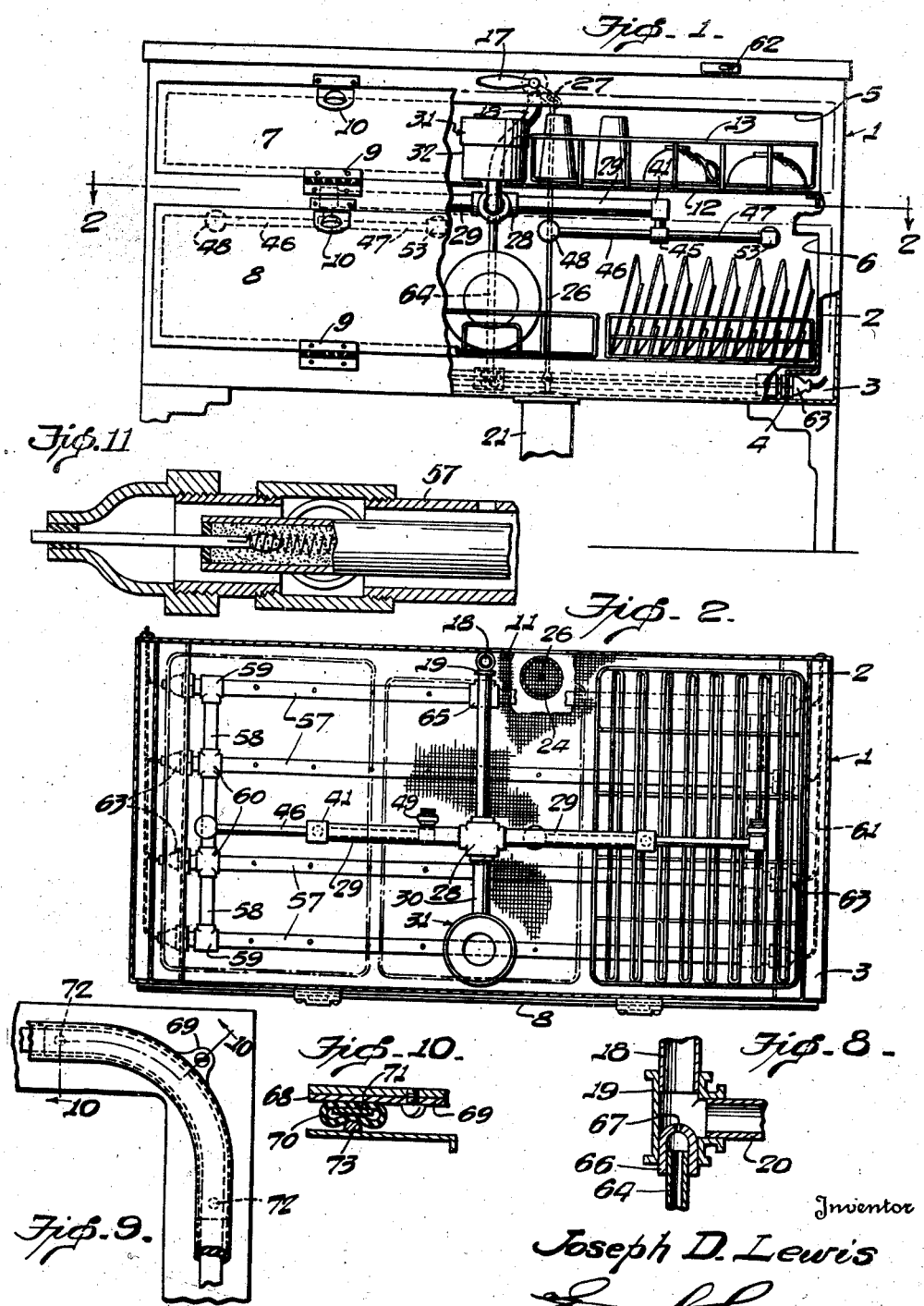
Inventor
Joseph D. Lewis
By Ernest S. Mechlin
         Attorney

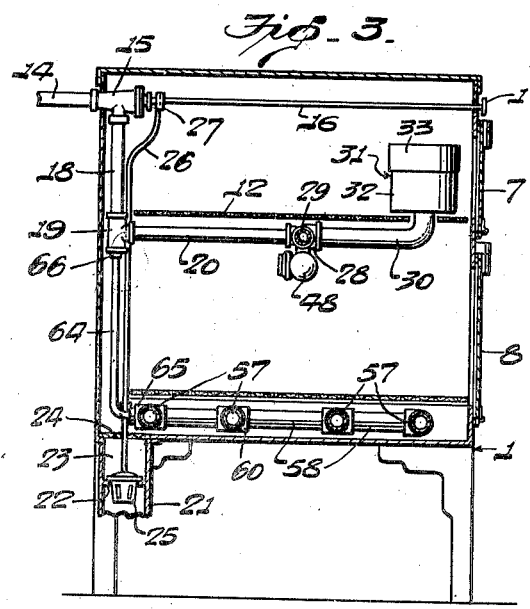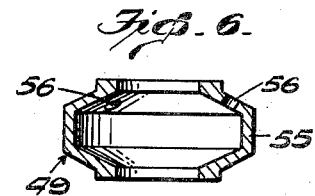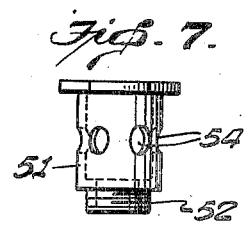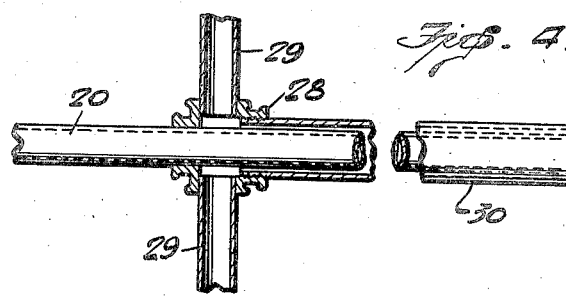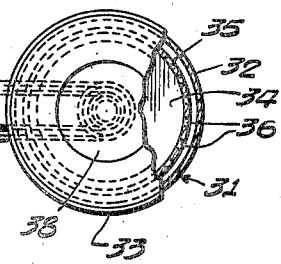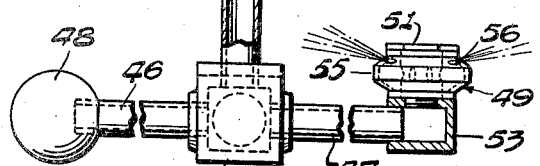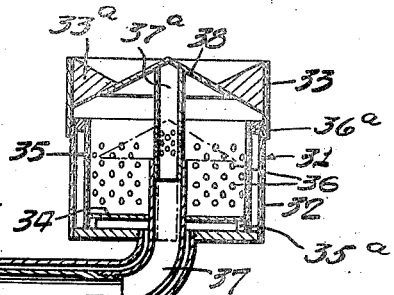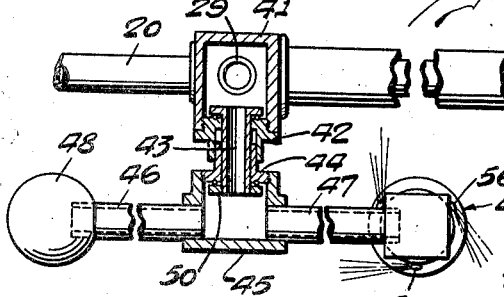
Inventor
Joseph D. Lewis Patented Aug. 23, 1938

2,127,778

UNITED STATES PATENT OFFICE 2,127,778

DISHWASHING AND STERILIZING MACHINE

Joseph D. Lewis, Santa Barbara, Calif.

Application November 12, 1935, Serial No. 49,381

7 Claims. (Cl. 141—9)

The invention relates to apparatus for cleansing dishes and various utensils and has for its general object the provision of a novel machine by means of which dishes and other articles or objects may be washed, rinsed and sterilized, it being a feature that the device is also capable of use as a dish and food warmer.

An important object of the invention is to provide a machine of this character in which the washing and rinsing is effected simply by the power derived from the pressure of the household water system, it being unnecessary to provide any motor driven pump for the purpose of distributing the soapsuds or clear water onto the dishes or other articles for the purpose of cleaning and then rinsing them.

Another important object is to provide a machine of this character in which sterilization is effected by means of superheated saturated steam, it being a feature of the construction that the air within the cabinet is caused to escape when steam is generated so as to insure saturation.

Another object is to provide a novel soap emulsifier whereby soapsuds will be most efficiently supplied to rotary distributors which are provided for the purpose of spraying soapsuds, and subsequently clear water, onto the dishes or other utensils for cleansing them.

An additional object is to provide a machine for this purpose which will be simple and inexpensive to make, easy to use, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a front elevation of the machine with parts broken away to disclose the interior, Figure 2 is a horizontal section on the line 2—2 of Figure 1 and showing the soap emulsifier and water inlet in top plan, Figure 3 is a vertical cross sectional view, Figure 4 is a horizontal section through the preferred form of soap emulsifier and showing one spray nozzle in plan, Figure 5 is a vertical sectional view through the emulsifier of Figure 4 and also through the swivel mounting for the water distributor, with certain parts shown in side elevation, Figure 6 is a detail sectional view through one of the rotary spray heads, Figure 7 is a side elevation of the supporting stem for one of the rotary spray heads, Figure 8 is a detail section showing the water feed to the sterilizer, Figure 9 is a fragmentary view illustrating the packing means for sealing the doors of the machine, Figure 10 is a detail section on the line 10—10 of Figure 9, Figure 11 is a fragmentary sectional view of one of the pipes of the sterilizing means.

Referring more particularly to the drawings I have shown the device as comprising an elongated rectangular cabinet or casing 1 of suitable material, preferably metal, finished in any desired manner to protect it against corrosion and to present a pleasing appearance. This casing may be of any specific detailed construction though it is here represented as provided at each end portion with a transverse partition 2 defining a compartment 3 for a purpose to be described. The lower end of each compartment is closed by a wall member 4. The front of the casing is provided with upper and lower openings 5 and 6, respectively, adapted to be closed by doors 7 and 8 hinged at their lower edges as shown at 9 and having their upper edges provided with appropriate latch devices 10 for the purpose of maintaining them closed when the machine is in operation. At this point it might be well to mention that there is an advantage in having the cabinet of elongated rectangular shape rather than square or of curved form inasmuch as it provides more space for conveniently accommodating articles to be cleaned.

Spaced a slight distance above the bottom of the cabinet is a reticulated shelf 11 and mounted at the intermediate portion of the casing is a similar foraminous shelf 12. These shelves are located at the bottom of the openings 6 and 5 and support wire or other skeleton trays 13 within which are disposed the dishes, tumblers and in fact whatever utensils are to be cleaned. Of course these trays are freely removable from the cabinet. Entering the back of the casing near its top is a water inlet pipe 14 equipped with a valve 15 of any preferred construction but of preferably the rotary plug type adapted to be opened and closed by means of a forwardly extending rotatable rod 16 which extends through the front of the cabinet and which is equipped with an operating handle 17. Connected with the valve device 15 is a depending pipe 18 connected with a T 19 from which extends a forwardly extending horizontal pipe 20, located beneath the upper shelf 12, for the purpose of conducting water to the soap emulsifying means and the rotary spray or distributing means to be described. Secured upon the bottom wall of the cabinet at the rear portion thereof and preferably almost beneath the valve device 15 is an outlet valve structure consisting of a pipe member 21 provided interiorly with a valve seat 22 spaced downwardly from its top to provide a sump 23 for taking care of residual water at the conclusion of the washing operation. The opening in the bottom of the cabinet is preferably covered with wire screen indicated at 24 to prevent any great accumulation of food fragments from entering and clogging the outlet valve. The valve seat 22 is normally closed by a valve plug 25 carried by the lower end of an upwardly extending rod 26 which is pivotally connected at its upper end with an arm 27 on the valve rod 16 so that when the handle 17 is turned to open the valve 15 the outlet valve will be opened on account of lifting of the plug 25 from the seat 22 and so that, conversely, when the valve 15 is closed the outlet valve will likewise be closed.

The water distribution system includes a fitting or member 28 through which the pipe 20 extends and with two opposite branches of which are connected pipes 29 which extend longitudinally of the intermediate portion of the cabinet. Secured within the remaining branch of the member 28 in spaced surrounding relation to the pipe 20 is a pipe 30 having an upwardly curved end connected with the bottom of the soap emusifier which is indicated as a whole by the numeral 31 and which is located above the upper shelf 12.

The emulsifier is shown in detail in Figures 4 and 5 wherein I have disclosed this device as comprising a cylindrical casing or shell 32 having a removable top section 33 containing an abutment or stop ring 33ª. Within the shell or casing is an inner receptacle 35 supported on legs 35ª and having a bottom 34 and having its periphery formed with perforations 36, this receptacle being intended to contain soap in granulated or flake form. The purpose of the legs 35ª is to space the bottom 34 from the bottom of the shell 32. The receptacle 35 is likewise spaced inwardly from the wall of the shell to define an annular space which is closed at the top by means of a ring 36ª. Detachably connected at 39 with the end of the pipe 20 is a pipe 37 which extends up through the center of the bottom 34 into the receptacle 35, the upper end of this pipe 37 having slidable therein the hollow perforated stem 37ª of a valve 38.

The water distributing means further includes a fitting 41 on the outer end of each of the pipes 29 provided at its bottom with a plug 42 through which extends a hollow stem 43 extending through a plug 44 in one branch of a T 45 from the other branches of which extend pipes 46 and 47, the former of which may simply be equipped with a counterbalance 48 but the latter of which carries the spray head 49 to be described. The intention is that the T's 45 are to be swivelly supported with respect to the fittings 41 and the lower end of the stem 43 is therefore represented as equipped with a nut 50 for maintaining the assembled relation of the parts. Likewise ball bearings are shown in Figure 5 but it will be readily understood that these details are immaterial as it is merely necessary to provide a swivel connection of any sort that will operate.

The construction of the revolving spray heads 49 is a matter of considerable importance as it is intended that they will cause the T's 45 carrying the pipes 46 and 47 to rotate while at the same time the spray heads will direct water upwardly against the articles upon the upper shelf 12 and downwardly onto the articles disposed on the lower shelf 11. Each revolving spray head is therefore disclosed as comprising a cylindrical nozzle member 51 having a hollow threaded stem 52 screwed into a fitting 53 on the end of each pipe 47. The other end of the nozzle member is closed preferably by an angular head as shown facilitating engagement by a wrench for assembling purposes, and the periphery is formed with a circumferential series of holes 54. Revoluble about the nozzle 51 is a head 55 which has its periphery formed with a plurality of holes 56 arranged at an angle as indicated so that water issuing from these holes 56 will cause the heads 55 to rotate while at the same time the reaction caused by the angularity of the holes will cause the pipes 46 and 47 with their connecting T's 45 to rotate as an assembly, thereby adequately spraying all the utensils without it being necessary to provide any motive power, other than the water pressure, for effecting the desired rotation.

The sterilizing device forming part of the machine comprises a plurality of spaced perforated pipes 57 which extend longitudinally of the cabinet at the bottom portion thereof. The pipes are supported at their ends by the above mentioned wall members 4. Near their ends these pipes are all connected by pipe sections 58 and the necessary fittings 59 and 60 so that there will be free circulation through all of them. Located within these pipes are electric heating units 57ª of elongated rod form and preferably what is known commercially as "Calrod" put out by the General Electric Company, the advantage of such a unit constructed of this material or in this manner being that it functions as an efficient heating element whether used in air or liquid, it being, however, a fact that an equivalent structure or unit could be employed, this being considered rather inconsequential in so far as the invention itself is concerned. These heating units extend to the ends of the pipes and are connected by conductors 61 with a suitable control switch 62 mounted at some convenient location on the cabinet and of course connected with a source of current. The compartments 3 referred to in the earlier part of the description are for the accommodation of the necessary terminal caps 63 on the pipes as well as the conductors 61.

As it is intended to sterilize by means of steam it is necessary to supply water within the pipes 57 for generating the steam. I therefore provide a relatively small tube 64 which connects with a fitting 65 on one of the pipes 57 and which leads from a nipple 66 in the remaining branch of the T 19, this nipple having a very small inlet opening 67 as shown in Figure 10 so that while the machine is in operation for washing dishes and other objects an adequate but yet not excessive supply of water will be fed to the pipes 57 so as to be converted into steam when the washing operation is completed and the switch 62 is closed to supply current to the heating units of the sterilizer.

As it is known that superheated saturated steam is the quickest and most approved method of sterilization and as I wish to take advantage of this fact, it becomes necessary that the doors 7 and 8 of the cabinet be hermetically sealed during the sterilizing operation. I have therefore devised a novel sealing gasket for the doors which, though it forms the subject-matter of a separate companion application, will nevertheless be briefly described herein for the sake of clearness. This sealing arrangement is represented as comprising a supporting or foundation plate 68 having apertured ears 69 by means of which it may be secured to the inner side of the door or the outer side of the cabinet at the door openings therein. This foundation plate carries a rubber tube 70 within which extends a metal strip 71 secured to the foundation plate at intervals by screws or the like indicated at 72 which must of course be introduced from the rear or underside of the strip or plate 68. As a further refinement the door or the cabinet may be provided with a relatively narrow strip 73 curved in cross section which is adapted to engage and compress the rubber tube when the doors are closed. Of course this sealing gasket follows the general contour of the doors or the door openings and it is of course immaterial whether the gasket and the strip 73 be applied, respectively, to the cabinet or the door. Clearly when the doors are shut and fastened by means of the latch devices 10 the compressing engagement of the strips 73 with the rubber tubes will form not only water-tight joints but joints which are also capable of withstanding any steam pressure that may be produced.

Assuming that the machine has been constructed and assembled as above described, the operation is as follows: An appropriate quantity of soap in granular or flake form is placed within the receptacle 35 of the emulsifier, at such time the valve being in its lowered position as shown by the dot and dash lines in Figure 5. The various utensils to be cleansed are placed within the baskets or trays 13 which are then slid into the cabinet and onto the shelves 11 and 12. The doors 7 and 8 are then closed and fastened by means of the latch devices 10. After these preliminary steps the operator grasps the handle 17 and moves it in the proper direction to open the inlet valve 15 and the outlet valve 25 whereupon water will flow from the intake pipe 14, through the valve device 15, pipe 18, T 19, pipe 20, pipe 37 and into the hollow stem 37ª, lifting the valve 38 so that the perforations therein will be above the upper end of the pipe 37 enabling the water to pass through them and into the soap so as to emulsify it. The engagement of the valve 38 with the abutment ring 33ª prevents the water and suds from escaping at the top. The soapsuds thus produced will pass through the perforations 36 into the annular space between the receptacle 35 and the shell 32, and then out through the annular space between the pipes 20 and 30 and pipes 29 to and through the fittings 41, the swivel stems 43, fittings 45, pipes 47, fittings 53, nozzles 51 and into the rotary spray heads 55 from which it will issue through the perforations or holes 56 in a direction substantially tangential to the periphery thereof and also inclined with respect to the axis of rotation. The consequent recoil will not only cause the spray heads 55 to rotate but will also cause the assemblies consisting of the fittings 45 and pipes 46 and 47 to rotate. In this way soapy water will be effectively sprayed over and onto the utensils on both of the shelves. As soon as the soap supply within the emulsifier is exhausted it is apparent that if the operation of the machine be continued nothing but plain water will be sprayed upon the utensils, thereby rinsing them.

During the washing action a certain amount of water passes from the T 19 through the small hole 67 and into the tube 64 which conducts it to the sterilizer pipes 57 which consequently become filled. After the washing and rinsing operations have been completed and it is desired to sterilize the utensils, the operator turns the handle 17 to close the water inlet valve 15 and outlet valve 25. Any residual water dripping from the trays, utensils or shelves will be accommodated within the sump 23. The switch 62 is then closed so that current will be supplied to the resistance or heating units within the pipes 57 and in a short time, depending upon the specific heating units and the strength of the current used, the water within the pipes 57 will be converted into steam which will pass out through the perforations and fill the interior of the cabinet and exert a sterilizing action on the utensils which will be continued until the supply of water within the pipes 57 has become exhausted. In actual practice I have found that sterilization with this saturated steam will require only about five minutes. It is contemplated that the switch 62 be a time switch, though details of such are not disclosed in view of the fact that such devices are well known. The advantage in employing a time switch is that the machine will not require the personal attention of the operator after the switch is closed. It is a desirable plan to set the switch to open at the expiration of a ten minute period so that after all the water in the pipes 57 is exhausted the continued flow of current through the heating units will cause the generation of dry heat so that if the doors 7 and 8 be partly or wholly opened the utensils will be dried rapidly. By the time the switch opens drying will actually be completed.

A feature worthy of consideration is that as the outlet valve 25 is closed and as the doors are hermetically sealed during the sterilizing operation, there will actually be generated superheated saturated steam which may be under pressure which, as is well known, is the most efficient method of sterilization, first because it is more penetrating than at atmospheric pressure, and second because the temperature is increased. For instance, steam under five pounds pressure reaches a temperature of 228° F., and under ten pounds pressure 240° F. Steam at 228° F. will destroy pathogenic micro-organisms in five minutes, whereas at 212° F. it requires at least ten minutes.

To insure that the cabinet will contain saturated steam, as above referred to, which means steam without an admixture of air, it may be well to close the switch a short time prior to the discontinuance of the rinsing operation so that steam will be generated before the handle 17 is moved to cut off the water supply and open the outlet valve. The reason for this is that the air within the cabinet, being at a lower temperature than the steam and consequently heavier, will be forced by the steam to the bottom of the cabinet and will escape through the outlet valve and be entirely replaced by the steam, an action which will require but a very short time. Closing of the outlet valve then will insure that the steam is saturated.

Aside from the question of the development of pressure, as mentioned above, it is known that superheated steam is produced by passing saturated steam over heated surfaces or coils. This is a distinct advantage of having an internal steam producing mechanism such as that I disclose. Moreover, with my construction, there is an additional beneficial result for the reason that when the water is exhausted the temperature of the sterilizing pipes will rise to approximately 750° F. so that as a result the steam within the chamber becomes superheated and the condensate is minimized.

From the foregoing description and a study of the drawings it will be apparent that I have thus provided a simply constructed and very easily operated machine for washing, rinsing, sterilizing and drying dishes or utensils of many sorts. Moreover, if desired, by turning on the current without supplying any water to the machine it can be used very effectively for simply warming dishes or even food if such is desired.

It is believed from the above that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described my invention, what I claim is:

1. In a machine of the character described, a cabinet having an opening equipped with a door, supporting shelves located within the cabinet in vertically spaced relation, a water distributor within the cabinet located between the shelves, and sterilizing means comprising a plurality of horizontally disposed pipes located at the bottom of the cabinet and containing heating units, said pipes being perforated, and a connection between the water distributor and said pipes for filling the latter when the former is in operation.

2. In a machine of the character described, a cabinet having an opening equipped with a door, vertically spaced foraminous shelves located within the cabinet, a rotary water distributor located between said shelves, soap emulsifying means connected with the distributor, a water supply pipe connected with the distributor, and sterilizing means comprising a plurality of horizontal perforated pipes located beneath the lower shelf and containing electrical heating units, and a pipe connection between the water supply pipe and said sterilizer pipes.

3. In a machine of the character described, a cabinet having an opening equipped with a door, upper and lower foraminous shelves located within the cabinet, a rotary water distributor located between said shelves, soap emulsifying means connected with the distributor, a water supply pipe connected with the distributor, and sterilizing means comprising a plurality of horizontal perforated pipes located beneath the lower shelf and containing electrical heating units, and a pipe connection between the water supply pipe and said sterilizer pipes including an inlet nipple within the water supply pipe and having a relatively small orifice therein.

4. In a dish washing machine, a cabinet having an opening equipped with a door, upper and lower foraminous shelves located within the cabinet for supporting articles, a water supply pipe located at the intermediate portion of the cabinet beneath the upper shelf, rotary water distributing means carried by and connected with said pipe, soap emulsifying means connected with the pipe, an outlet valve, a water inlet valve equipped with operating means, means connecting said operating means and said outlet valve for simultaneous operation of both valves, and sterilizing means comprising a plurality of perforated horizontally disposed pipes located beneath the lower shelf and containing electrical heating units, and a tubular connection between said water supply pipe and said last named pipes.

5. In a dishwashing machine, a cabinet having an opening equipped with a door, said cabinet being provided at its ends with compartments in non-communicating relation to the interior, skeleton shelves located within the cabinet for supporting articles, a water supply pipe located within the cabinet at the central portion thereof between the shelves, soap emulsifying means connected with said pipe, other pipes supported by said supply pipe in non-communicating relation thereto, a pair of pipes connected with said second named pipes, rotary water distributing means carried by said pair of pipes, and sterilizing means located at the bottom of the cabinet and including a series of horizontally disposed perforated pipes containing electrical heating units and connected with said water supply pipe, the ends of said perforated pipes extending into said compartments and said compartments accommodating current feed wires for the heating units.

6. In a dishwashing machine, a cabinet having a door, vertical partitions within the end portions of the cabinet defining compartments in non-communicating relation to the interior, means within the cabinet for supporting articles, a water supply pipe entering the cabinet, water distributing means carried by said supply pipe, means connected with the supply pipe for supplying emulsified soap to the water distributing means, and sterilizing means comprising a series of horizontally disposed perforated pipes located within the bottom of the cabinet and connecting with one another, said perforated pipes containing electrical heating units and having their ends extending into said compartments, said compartments accommodating current feed wires for the heating units.

7. In a dishwashing machine, a cabinet having an opening equipped with a door, vertically spaced shelves located within the cabinet for supporting articles, a water supply pipe entering the cabinet and located between the shelves, a receptacle for soap located above the upper shelf and connected with said supply pipe, a pipe surrounding said supply pipe and connected with said receptacle, a pair of pipes connected with said second named pipe, horizontally disposed rotary pipes swivelly supported beneath and in communicating relation to said pair of pipes, and rotary spray heads carried by said last named pipes.

JOSEPH D. LEWIS.